(12) United States Patent
Tabata

(10) Patent No.: US 6,540,642 B2
(45) Date of Patent: Apr. 1, 2003

(54) VEHICLE CONTROL SYSTEM AND VEHICLE CONTROL METHOD

(75) Inventor: Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 57 days.

(21) Appl. No.: 09/725,223

(22) Filed: Nov. 29, 2000

(65) Prior Publication Data

US 2001/0003109 A1 Jun. 7, 2001

(30) Foreign Application Priority Data

Dec. 2, 1999 (JP) ............................ 11-343825

(51) Int. Cl.⁷ .................. B60K 41/02; B60K 1/00
(52) U.S. Cl. .......................... 477/5; 180/65.2
(58) Field of Search .................. 475/5; 477/3, 5, 477/6; 192/3.54, 3.61, 3.62; 180/65.2, 65.3, 65.6

(56) References Cited

U.S. PATENT DOCUMENTS

| | | | |
|---|---|---|---|
| 4,438,342 A | * 3/1984 | Kenyon | 180/65.2 X |
| 5,072,815 A | * 12/1991 | Jarvis | 192/3.54 |
| 5,337,848 A | * 8/1994 | Bader | 180/65.2 |
| 5,441,462 A | * 8/1995 | Chan | 477/74 |
| 5,495,906 A | * 3/1996 | Furutani | 180/65.2 |
| 5,713,425 A | * 2/1998 | Buschhaus et al. | 180/65.2 |
| 5,984,034 A | * 11/1999 | Morisawa et al. | 180/65.2 |
| 6,019,698 A | * 2/2000 | Lawrie et al. | 477/5 |
| 6,164,400 A | * 12/2000 | Jankovic et al. | 180/65.2 |
| 6,306,056 B1 | * 10/2001 | Moore | 477/2 X |
| 6,346,062 B1 | * 2/2002 | Shimabukuro et al. | 477/5 |
| 6,359,404 B1 | * 3/2002 | Sugiyama et al. | 180/65.2 X |

FOREIGN PATENT DOCUMENTS

JP    11-141665    5/1999

* cited by examiner

Primary Examiner—Rodney H. Bonck
Assistant Examiner—Roger Pang
(74) Attorney, Agent, or Firm—Oliff & Berridge, PLC

(57) ABSTRACT

A torque transmitting mechanism of a vehicle is structured such that engine torque is transmitted to front wheels via a transmission. A clutch is disposed in the torque transmission path leading to the transmission from the engine, which disengages upon gear shifting of the transmission. The vehicle control system of the invention is provided with a motor generator capable of transmitting the torque to rear wheels without passing through the transmission, and is structured so as to increase the torque transmitted from the motor generator to the rear wheels upon gear shifting of the transmission. According to this control system, a decrease in torque to be transmitted from the motor generator to the rear wheels is able to be suppressed during gear shifting with no need for an additional drive source.

22 Claims, 8 Drawing Sheets

VEHICLE CONTROL SYSTEM AND VEHICLE CONTROL METHOD

INCORPORATION BY REFERENCE

The disclosure of Japanese Patent Application No. HEI 11-343825 filed on Dec. 2, 1999 including the specifications drawings and abstract is incorporated herein by reference in its entirety.

BACKGROUND OF THE INVENTION

1. Field of the Invention

The invention relates to a vehicle control system and a vheicle control method capable of increasing the torque of a second drive source for power transmission to wheels upon a decrease in the torque of a first drive source for power transmission to wheels owing to shift operations by a transmission.

2. Description of the Related Art

There has been a well known synchro-mesh transmission as related art, which is provided with a clutch that is automatically engaged/disengaged on the torque transmission path leading to the transmission from the drive source. There are two types of the above-identified transmission: a semi-automatic type in which shift operation is manually performed by a driver such that engagement/disengagement of a clutch is automatically performed in association with the shift operation, and a fully automatic type in which shift operation is automatically performed and engagement/disengagement of a clutch is also automatically performed in association with the shift operation. The semi-automatic transmission may allow the driver to perform shift operations by his/her own intention, which hardly causes the driver to feel uneasiness owing to the drop in the driving force resulting from disengagement of the clutch during the shift operation. Meanwhile the fully automatic transmission may cause the drivers to feel uneasiness owing to the drop in the driving force resulting from the disengagement of the clutch during the shift operation because the shift operation is automatically performed irrespective of the driver's intention.

Japanese Patent Application Laid-Open No. HEI 11-141665 discloses an example of a transmission for a vehicle, which is capable of preventing the driver from feeling uneasiness during shift operations. The, transmission disclosed in the aforementioned related art has input and output shafts. The input/output shafts and the area therearound are provided with various types of gears for setting the forward speeds from first to fifth and reverse speed, as well as a plurality of synchromesh mechanisms for connecting/disconnecting the torque transmission path between various gears and the input shaft/output shafts. The transmission is further provided with an electric motor connected to the output shaft, which allows torque transmission, a clutch disposed between a crank shaft of an engine and the input shaft of the transmission, and a controller for controlling the engine, synchromesh mechanism, clutch, and electric motor. The controller is structured to receive input of signals from a shift position sensor, an accelerator opening sensor, a vehicle speed sensor and the like.

With the vehicle transmission disclosed in the aforementioned related art, the controller outputs a transmission signal in accordance with information such as of accelerator opening and vehicle speed in a vehicle running state upon engine torque transmission to wheels The clutch disposed between the engine and the transmission is then disengaged and the electric motor is driven to transmit the torque to the output shaft. Along with disengagement of the clutch, the synchromesh mechanism is actuated for gear shifting. The clutch is engaged and the electric motor is stopped so as to allow transmission of the engine torque to the wheels. The vehicle transmission as identified above transmits the torque of the electric motor to the wheels during gear shifting upon disengagement of the clutch so as not to allow transmission of the engine torque to the wheels. Therefore deterioration in the driving force can be suppressed by transmitting the torque of the electric motor to the wheels. Accordingly, the driver hardly feels uneasiness from the shifting operation.

The electric motor provided in the vehicle transmission as disclosed in the related art is intended to suppress a decrease in the torque transferred to the wheels during a shifting operation. The additional driving source just to suppress a decrease in torque, however, may increase the manufacturing cost and weight of the vehicle.

SUMMARY OF THE INVENTION

In view of the foregoing problems, it is an object of the invention to provide a vehicle control system capable of suppressing a decrease in torque transmitted to the wheels during a shifting operation without employing the additional drive source to suppress a decreasing torque.

In order to achieve the aforementioned object, the vehicle control system according to one aspect of the invention is structured such that the torque of a first drive source is transmitted to the wheels via a transmission, a clutch is provided on the torque transmission path leading to the transmission from the first drive source, and the clutch is disengaged upon a shifting operation of the transmission. In this vehicle control system, the torque of a second drive source is transmitted to the wheels to be driven without passing through the transmission. The torque transmitted from the second drive source to the wheels is increased upon a shifting operation of the transmission.

According to the aspect of the invention, the torque transmitted from the first drive source to the wheels is decreased during a shifting operation of the transmission. Meanwhile the torque transmitted from the second drive source to the wheels is increased in order to suppress a decrease in the driving force acting on the vehicle, as a whole. The second drive source preliminarily mounted on the vehicle serves to suppress a decrease in the torque transmitted to the wheels during a shifting operation. This may eliminate the need for employing an additional drive source for suppressing a decrease in torque during a shifting operation. As a result, the vehicle manufacturing cost and the vehicle weight can be reduced.

Alternatively the wheels may include first wheels and second wheels each having a different torque transmission path such that the degree of increase in torque transmitted from the second drive source to the second wheels during a shifting operation may be variable depending on whether torque is transmitted only to the first wheels during a shifting operation of the transmission, or to both the first and the second wheels during a shifting operation of the transmission. According to the above example, the torque transmitted from the second drive source to the second wheels during a shifting operation can be controlled depending on the driven state of the vehicle. As a result, this may prevent a change in the running performance of the vehicle between the state before shifting and the state during shifting.

When increasing the torque to be transmitted from the second drive source to the second wheels, upon a shifting operation of the transmission, the degree of increase in torque being transmitted to the first and the second wheels maybe set to be smaller than the degree of increase in torque being transmitted only to the first wheels.

According to the aforementioned structure, in the state where the torque of the second drive source is transmitted to the second wheels in accordance with a torque output request other than a shifting operation, an excessive increase in torque of the second wheels can be prevented even if the torque transmission to the second wheels is increased from a shifting operation. Slippage of the second wheels, thus, can be prevented.

An embodiment of this invention is not limited to a vehicle control system such as that described heretofore. Another embodiment of the invention includes, for example, a four-wheel-drive vehicle equipped with a vehicle control system and a vehicle control method.

DETAILED DESCRIPTION OF THE PREFERRED EMBODIMENTS

Figure 1:
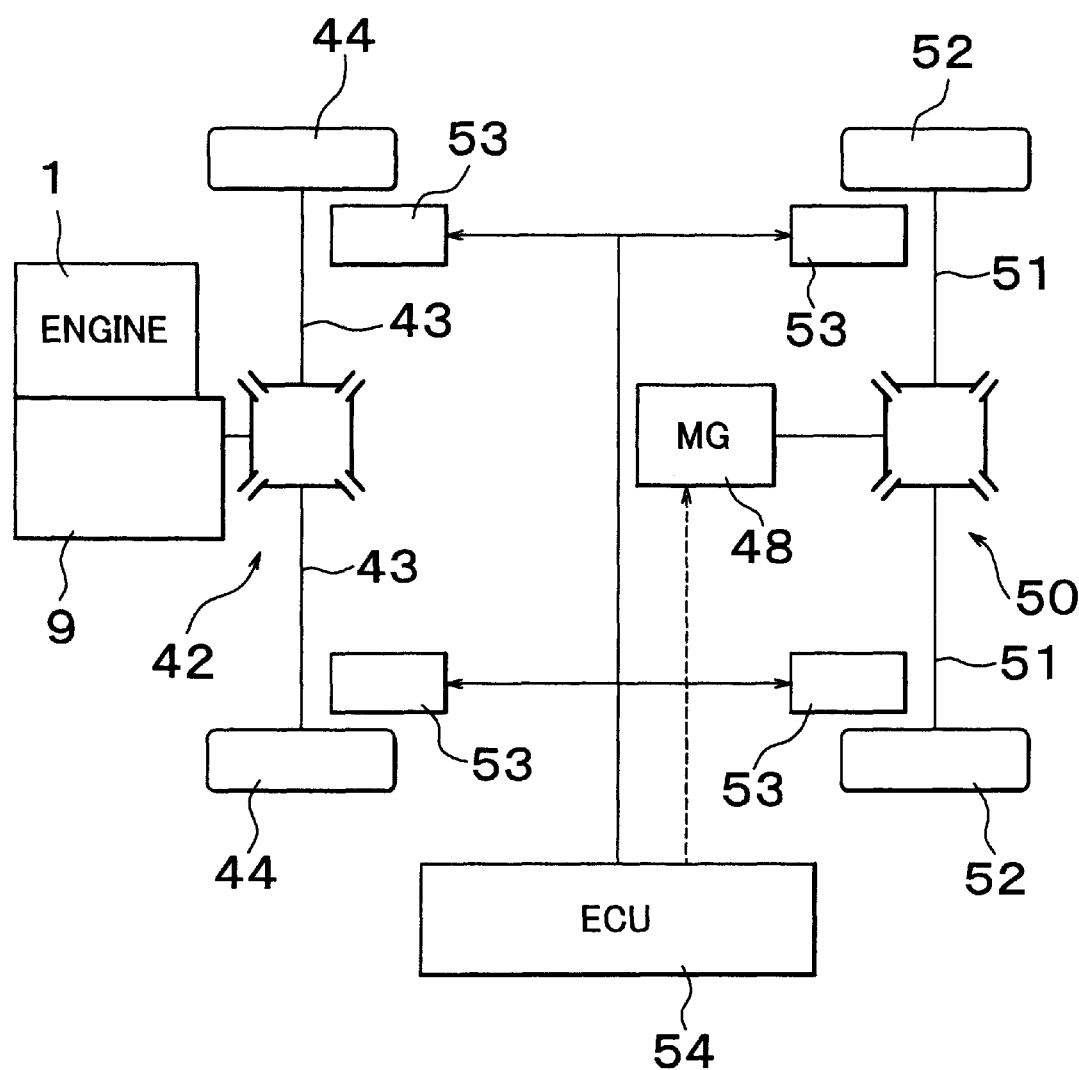
FIG. 1 is a plan view showing a schematic structure of a four-wheel drive vehicle controlled by the present invention.
Figure 2:
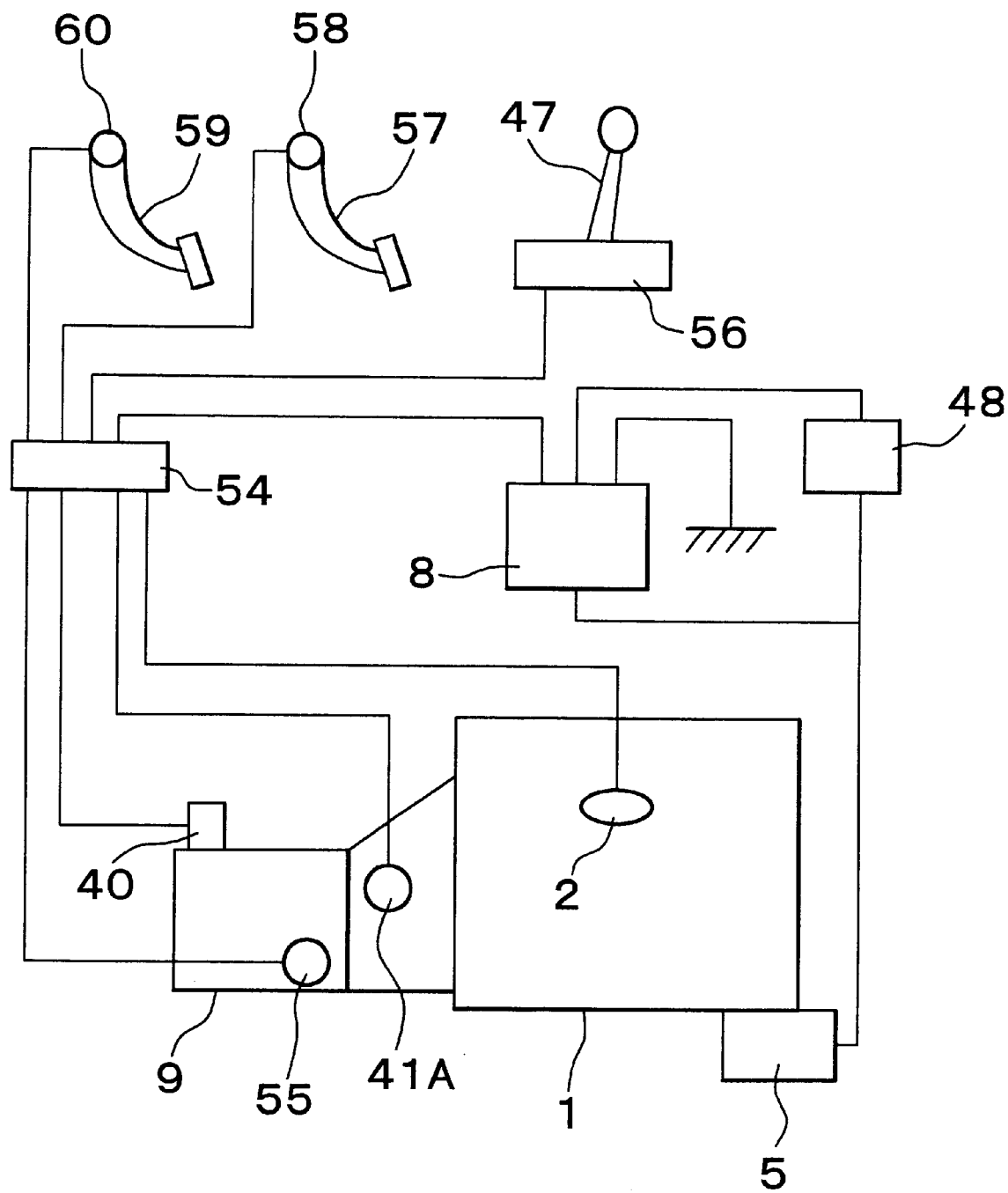
FIG. 2 is a block diagram showing a power plant and the control system thereof of the four-wheel-drive vehicle shown in FIG. 1.
Figure 3:
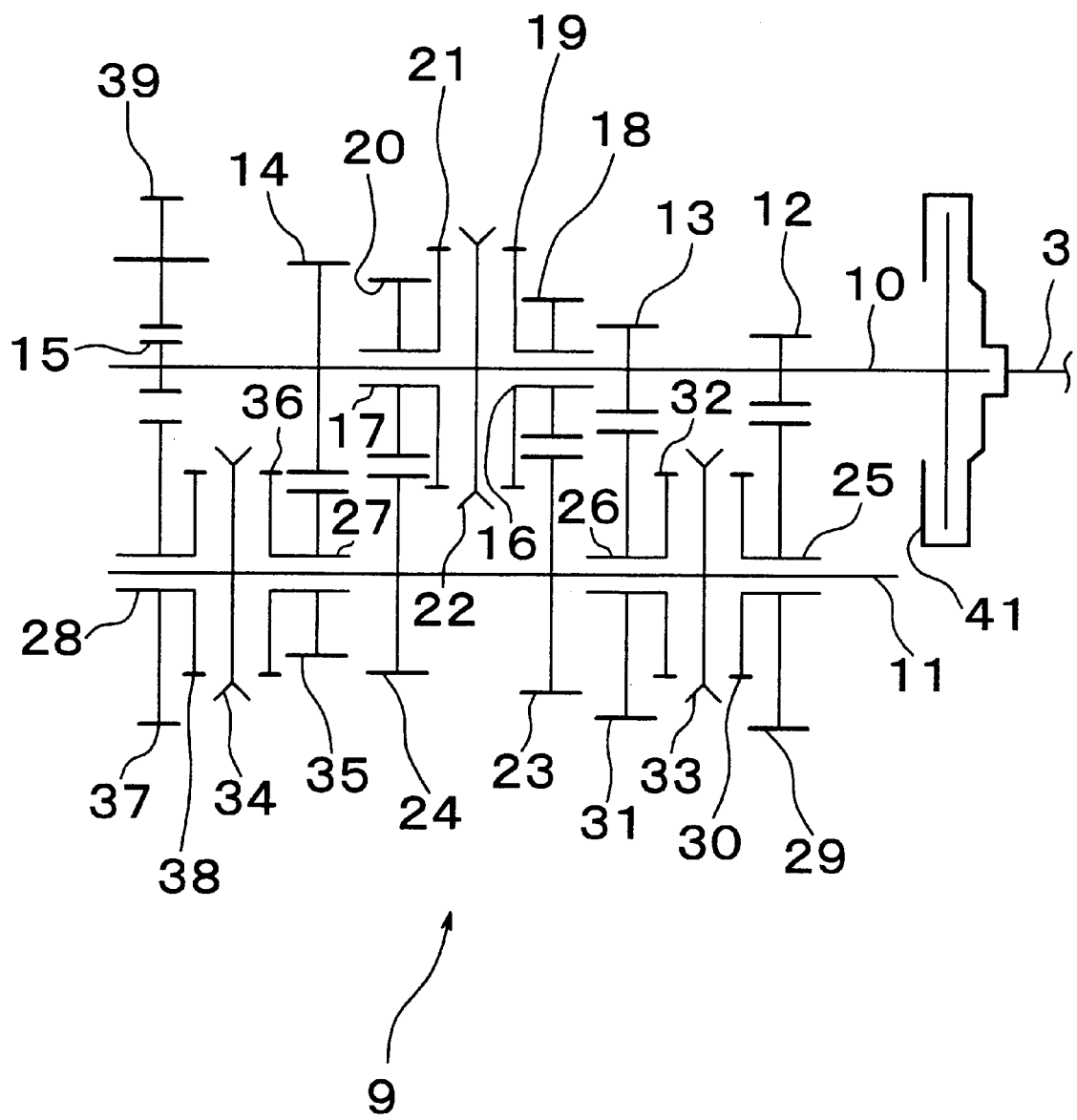
FIG. 3 is a skelton diagram of a transmission shown in FIG. 2.

The invention will hereinafter be described referring to the drawings. FIG. 1 is a plan view showing a schematic structure of a four-wheel-drive vehicle controlled by the present invention. FIG. 2 is a block diagram showing a control system for an engine 1, a transmission 9, and a motor generator 48 and so forth mounted in the four-wheel-drive vehicle shown in FIG. 1. FIG. 3 is a skelton diagram showing a detailed structure of the transmission 9 shown in FIG. 2. The engine 1, mounted at the front of the vehicle, may be any type of internal combustion engine, for example, a gasoline engine, a diesel engine, or an LPG engine.

In the following case, a gasoline engine is employed as the engine 1. The engine 1 has a known structure provided with intake/exhaust system (not shown), a fuel injection system (not shown), an ignition system (not shown), a cooling system (not shown) and the like. An intake pipe of the engine 1 is provided with an electronic throttle valve (not shown) and an electronic throttle actuator 2 that controls the opening of the electronic throttle valve.

A crank shaft 3 of the engine 1 is disposed in the lateral direction of the vehicle. A motor generator (MG) 5 connected to the crank shaft 3 of the engine 1 is provided such that torque can be transmitted therebetween. The motor generator 5 serves as a generator and a motor, and is electrically connected to a battery 8 via an inverter (not shown). Power generated by the battery 8 is supplied to the motor generator 5 so as to be driven as a generator. The resultant torque is used to actuate the engine. It is also possible to transmit engine torque to the motor generator 5 for generating power to charge the battery 8.

The transmission 9 is disposed at the output side of the engine 1, and includes an input shaft 10 and an output shaft 11 disposed parallel to each other and arranged in the lateral direction of the vehicle. The input shaft 10 is structured to be rotated together with a first speed input gear 12, a second speed input gear 13, a fifth speed input gear 14, and a reverse input gear 15. The input shaft 10 is provided with hollow shafts 16 and 17 which are rotatable relative to this input shaft 10. The hollow shaft 16 is provided with third speed input gears 18 and 19, and the hollow shaft 17 is provided with fourth speed gears 20 and 21. A sleeve 22, rotated together with the input shaft 10 and moveable along the axis thereof, is interposed between the hollow shafts 16 and 17. A gear (not shown) is formed on the inner periphery of the sleeve 22. A synchromesh mechanism (not shown) is formed on the outer periphery of the input shaft 10 such that the gear of the sleeve 22 can be smoothly meshed with the gears 19 and 21.

The output shaft 11 is structured to be rotated together with a second speed output gear 23 and a fourth speed output gear 24. The output shaft 11 is provided with hollow shafts 25, 26, 27, and 28 which are rotatable relative to this output shaft 11. The hollow shaft 25 is provided with first speed output gears 29 and 30, and the hollow shaft 26 is provided with second speed gears 31 and 32.

A sleeve 33, which rotates together with the output shaft 11 and is moveable along the axis thereof, is interposed between the hollow shafts 25 and 26 of the output shaft 11. A gear (not shown) is formed on the inner periphery of the sleeve 33. The first speed output gear 29 is meshed with the first input gear 12, and the second speed output gear 31 is meshed with the second speed input gear 13. The third speed output gear 23 is meshed with the third speed input gear 18, and the fourth speed output gear 24 is meshed with the fourth input gear 20.

A sleeve 34, which rotates together with the output shaft 11 and is moveable along the axis thereof, is interposed between the hollow shafts 27 and 28 of the output shaft 11. A gear (not shown) is formed on the inner periphery of the sleeve 34. A fifth speed output gear 35 and an output gear 36 are provided on the hollow shaft 27, and a reverse output gear 37 and an output gear 38 are provided on the hollow shaft 28. The fifth output gear 35 is meshed with the fifth input gear 14. The rear speed output gear 37 and the rear speed input gear 15 are meshed with an idler gear 39. An actuator 40 is provided to control each operation of the sleeves 22, 33, and 34, independently.

In the transmission 9, the sleeve 33 moves along the axis of the output shaft 11 to bring the gear of the sleeve 33 into mesh with the gear 30. As a result, the input shaft 10 and the output shaft 11 become connected to allow torque transmission via the second speed input gear 13 and the second speed output gear 31, thus establishing the second speed.

When the sleeve 22 moves along the axis of the input shaft 10 to bring the gear of the sleeve 22 into mesh with a gear 19, the input shaft 10 and the output shaft 11 become connected to allow torque transmission via the third speed input gear 18 and the third speed output gear 23, thus establishing the third speed. When the sleeve 22 further moves along the axis of the input shaft 10 to bring the gear of the sleeve 22 into mesh with the gear 21, the input shaft 10 and the output shaft 11 become connected to allow torque transmission via the fourth speed input gear 20 and the fourth speed output gear 24, thus establishing the fourth speed.

When the sleeve 34 moves along the axis of the output shaft 11 to bring the gear of the sleeve 34 into mesh with the gear 36, the input shaft 10 and the output shaft 11 become connected to allow torque transmission via the fifth speed input gear 14 and the fifth speed output gear 35, thus establishing the fifth speed. When the sleeve 34 further moves along the axis of the output shaft 11 to bring the gear of the sleeve 34 into mesh with the gear 38, the input shaft 10 and the output shaft 11 become connected to allow torque transmission via the reverse input gear 15, the idler gear 39, and the reverse output gear 37, thus establishing reverse.

A clutch is disposed between the crank shaft 3 and the input shaft 10. A clutch actuator 41A is also provided to control engagement/disengagement of the clutch 41. Left and right front wheels 44 are linked to the output side of the output shaft 11 so as to allow torque transmission via a front differential 42 and a front drive shaft 43.

Figure 4:
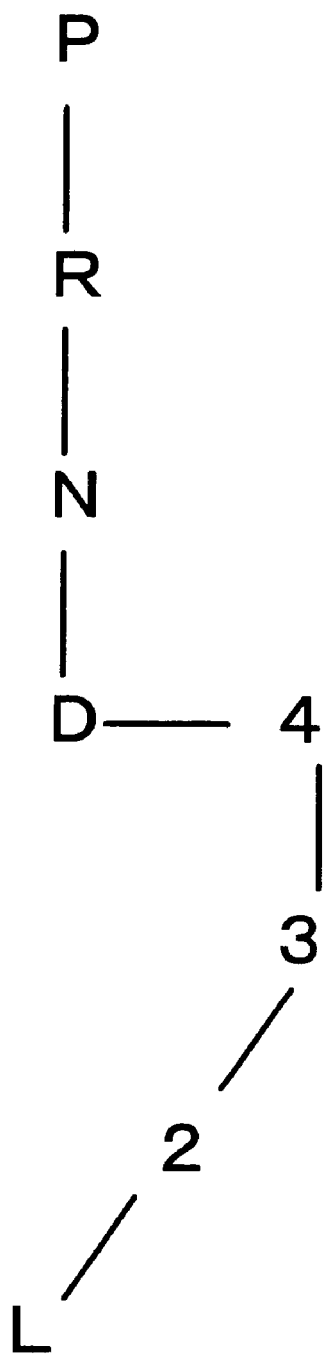
FIG. 4 is a conceptual view representing a shift position selected through a shift lever operation shown in FIG. 2.

A shift lever 47 operated by a driver is provided in a vehicle compartment. FIG. 4 is a view that two-dimensionally shows an example of the shift position selected through operation of the shift lever 47. That is, the position P (park), the position R (reverse), the position N (neutral), the position D (drive), the position 4, the position 3, the position 2, and the position L can be selected in either direction in the order shown in the drawing.

In the state where the position D is selected, the gear ratio of the transmission 9 can be automatically controlled to any speed selected among the first to the fifth forward speeds. At the position 4, any speed selected among the first to the fourth of the forward speeds can be automatically controlled. At the position 3, any speed selected among the first to the third forward speeds can be automatically controlled. At the position 2, any speed selected from the first or the second forward speed can be automatically controlled. At the position L, the first forward speed is established.

The motor generator 48, mounted at the rear of the vehicle serves as a generator and a motor (drive source), which is electrically coupled with a battery 8 via an inverter (not shown). The motor generator 48 is electrically coupled with a motor generator 5, as well as with left and right rear wheels allowing torque transmission via a rear differential 50 and a rear drive shaft 51. As described above, the front wheels 44 and the rear wheels 51 are connected with different torque transmission paths.

The motor generator 48 is powered by the battery 8 to serve as the motor such that the resultant torque can be transmitted to the rear wheels 52. The motor generator 5 is driven to serve as a generator such that the resultant power is supplied to the motor generator 48 to serve as the motor. The resultant torque can thus be transmitted to the rear wheels. That is, in the present, invention, the torque of the motor generator 48 can be transmitted to the rear wheels 52 without passing through the transmission 9. The torque of the engine 1, however, cannot be transmitted to the rear wheels 52. Meanwhile, the motor generator 48 may be driven to serve as the motor such that the resultant power can be used to charge the battery 8. The front and rear wheels 44 and 52 are respectively provided with a brake system 53 composed of a wheel cylinder and a wheel revolution speed sensor.

Figure 5:
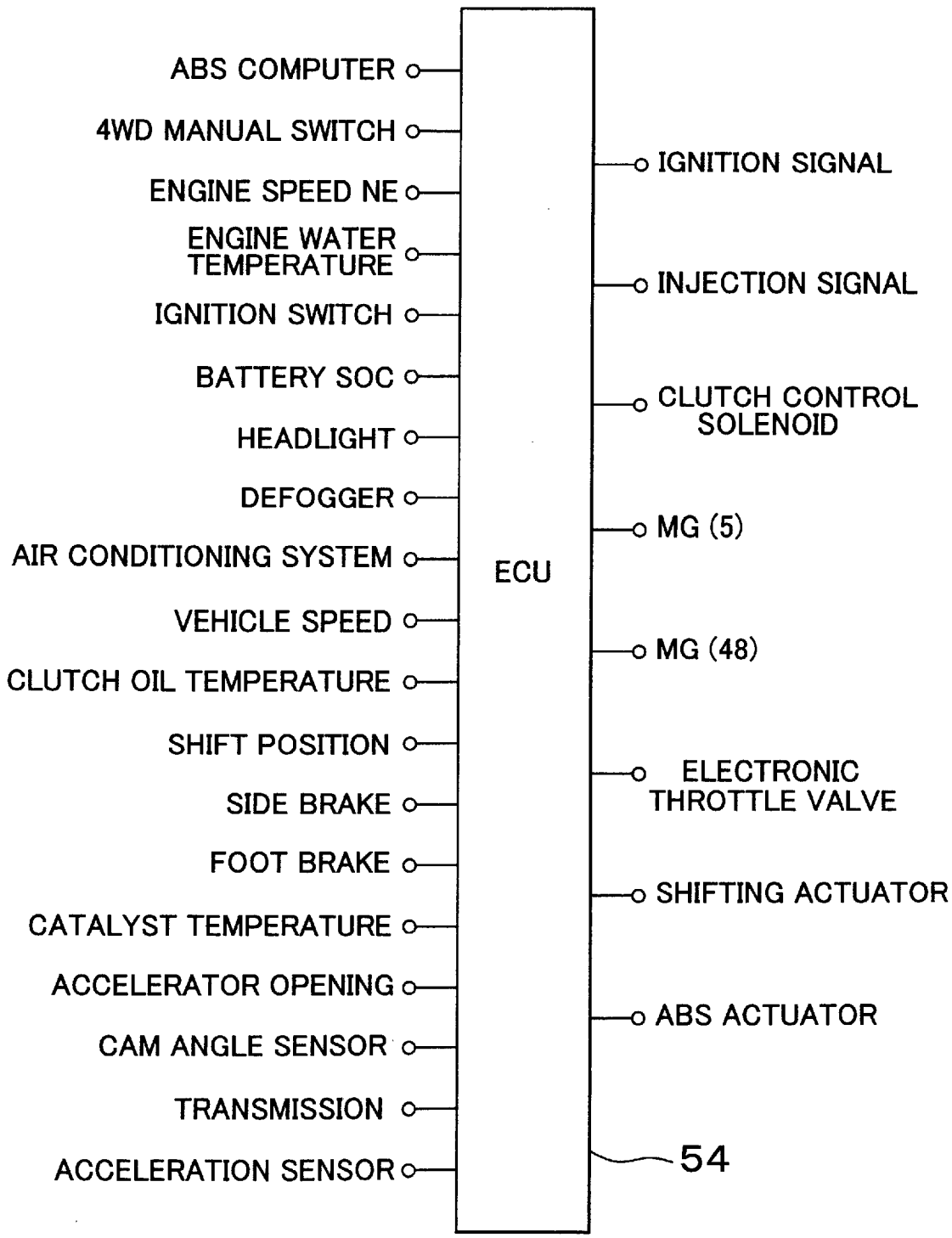
FIG. 5 shows signals input from and output to an electric control unit shown in FIGS. 1 and 2.

An electronic control unit (ECU) is provided as a controller for controlling the vehicle as a whole. The ECU is composed of an arithmetic processing unit (CPU or MPU), a memory unit (RAM and ROM), and a micro-computer mainly formed of an input/output interface. FIG. 5 shows signals input to and output from the ECU 54.

Input to the ECU 54 are signals from an ABS (anti-lock brake system) computer for controlling a brake unit 53, signals from a 4WD manual switch for selecting between a four-wheel-drive state and a two-wheel-drive state of the vehicle, signals indicating engine speeds, signals indicating engine water temperature, signals of ignition switch, signals indicating the SOC (state of charge), ON/OFF signals of headlights, defogger, and air conditioning system, vehicle speed signals (signals of the output shaft rotation sensor 55), signals indicating clutch oil temperature, signals from a shift position sensor 56 for detecting operation of the shift lever 47, ON/OFF signals from a side brake, signals from a foot brake sensor 58 for detecting the operation of the foot brake 57, signals from an accelerator opening sensor 60 for detecting the operation of an accelerator pedal 59, signals from a cam angle sensor, signals indicating the gear established by the transmission 9, and signals from the vehicle acceleration sensor and so forth.

Output from the ECU 54 are signals for controlling the ignition system, signals for controlling the fuel injection system, signals to the clutch control solenoid (clutch actuator 41A) for controlling engagement/disengagement of the clutch 41, signals for controlling the motor generators 5 and 48, signals to the electronic throttle actuator 2 for controlling the electronic throttle valve, signals for controlling the shifting actuator 40, and signals for controlling the ABS actuator and so forth.

In the embodiment, the engine 1 and the motor generator 48 respectively correspond to the first drive source and the second drive source. The front wheels 44 correspond to the first wheels, and the rear wheels 52 correspond to the second wheels of the invention. The front differential 42, front drive shaft 43, rear differential 50, and rear drive shaft 51 correspond to the torque transmission path of the invention.

Referring to the flowchart shown in FIG. 6, an example of control for the above-structured four-wheel-drive vehicle will be described. When the system is activated upon operation of the ignition switch, the ECU 54 starts input signal processing (step S1). In accordance with the starting operation by the driver, the motor generator 5 expected to serve as the motor is powered and driven by the battery 8 so as to start the engine 1 with the resultant torque. When the shift position is switched from position N to position D upon operation of the shift lever 47, the shift position sensor 56 detects the operation of the shift lever 47 such that starting control of the vehicle is performed.

First, the clutch 41 is disengaged and the sleeve 33 moves along the axis of the output shaft 11 so as to connect the first speed output gear 29 to the output shaft 11, thus establishing the first speed. When the driver depresses the accelerator pedal 59, the opening of the electronic throttle valve is increased to enhance the engine revolution speed to gradually bring the clutch 41 into engagement. That is, the torque of the engine 1 is transmitted to the front wheels 44 for generating the driving force.

Figure 7:
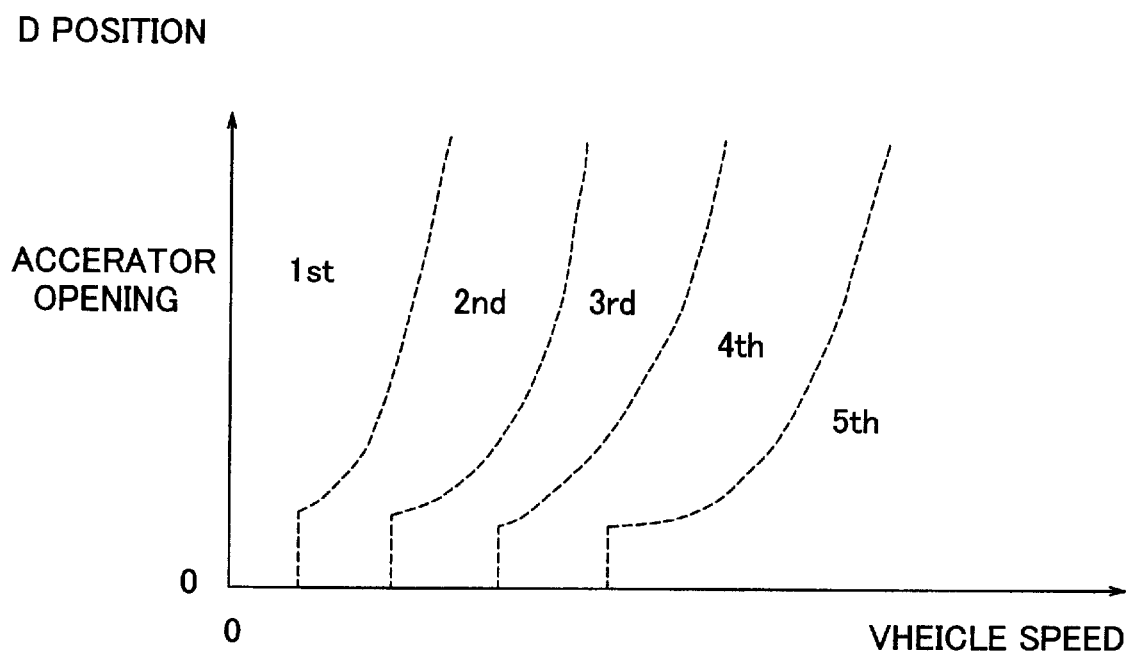
FIG. 7 is a gear shifting map for executing the control shown in FIG. 6.

The ECU 54 has a gear shifting map for controlling the gear shifting of the transmission 9 in accordance with the vehicle speed and the accelerator opening. In accordance with the gear shifting map, the gear shifting is determined. FIG. 7 shows an example of the gear shifting map showing each region of the first to the fifth speeds that can be set by the transmission 9 in the state where the positions D is selected through operation of the shift lever 47. According to the gear shifting map, the respective regions of the first to the fifth speeds are defined by upshift points shown by dashed lines.

It is next determined whether or not the gear shifting request has been issued in accordance with the gear shifting map shown in FIG. 7 (step S2). If NO in step S2, the process is directly returned. Meanwhile, for example, if the running state of the vehicle has changed from the region corresponding to the first speed to the region corresponding to the second speed in the gear shifting map, the determination of step S2 becomes YES. Accordingly, the gear shifting signal for upshifting the gear of the transmission 9 from the first to the second speed is output from the ECU 54.

Upon output of the gear shifting signal from the ECU 54, the clutch 41 is disengaged such that the engine torque is not transmitted to the input shaft 10, and the electronic throttle actuator 2 acts to close the electronic throttle valve so as to decrease the engine speed. Concurrently, the gear shifting actuator 40 is activated to move the sleeve 33 along the axis of the output shaft 11 such that the output shaft 11 and the second speed output gear 31 become connected to allow torque transmission. Then, the clutch 41 is engaged and the electronic throttle valve of the engine 1 is controlled to be opened to a degree corresponding to the accelerator opening. As a result, the torque of the engine 1 is transmitted to the transmission 9. The aforementioned gear shifting control will be performed in the state where the accelerator pedal 59 is kept depressed.

Upshifting from the first to the second gear speed was explained above. Likewise upshifting between adjacent gears among the second to the fifth gear speeds can be performed. Meanwhile, the reverse gear is established in the same manner as when starting the vehicle from the first speed as described above except that the torque of the input shaft 10 is controlled to be transmitted to the output shaft 11 via the rear speed input gear 15, the idler gear 39, and the reverse output gear 37 by moving the sleeve 34 along the axis of the output shaft 11.

As a result, the transmission 9 shown in FIGS. 1 to 3 is formed as a fully automatic transmission in which the gear shifting determination is performed according to the gear shifting map, and operation of the respective sleeves 22, 33, and 34 for gear shifting and engagement/disengagement of the clutch 41 can be performed.

In the system shown in FIGS. 1 to 3, the clutch 41 is disengaged during a shifting operation. This may result in failure to transmit the engine torque to the front wheels 44, that is, loss of the torque, thus making the driver feel uneasiness. Therefore, the following control is performed in parallel with upshifting control.

First, it is determined whether or not the vehicle is running in the four-wheel-drive mode based on the 4WD manual switch signal (step S3). If YES in step S3, indicating that the motor generator 48 is being driven and that torque is being transmitted to the rear wheels 52, the process proceeds to the subsequent step (step S4). In step S4, control is performed to slightly increase the torque of the motor generator 48 so as not to cause the rear wheels 53 to slip. The routine then returns. The determination as to whether the rear wheels 53 slip or not can be made based on a signal from the ABS computer.

Meanwhile NO in step S3 indicates that torque is not being transmitted from the motor generator 48 to the rear wheels 52. The process then proceeds to the subsequent step (step S5) where power generated by either the battery 8 or the motor generator 5 serving as a generator is supplied to the motor generator 48 driven as a motor so as to transmit torque to the rear wheels 52. The control routine then is returned. In step S5, the torque transmitted to the wheels 52 is controlled so as not to cause them to slip. In this case, steps S2 to S5 correspond to the function means shown in FIG. 1, that is, the means of increasing torque.

Figure 8:
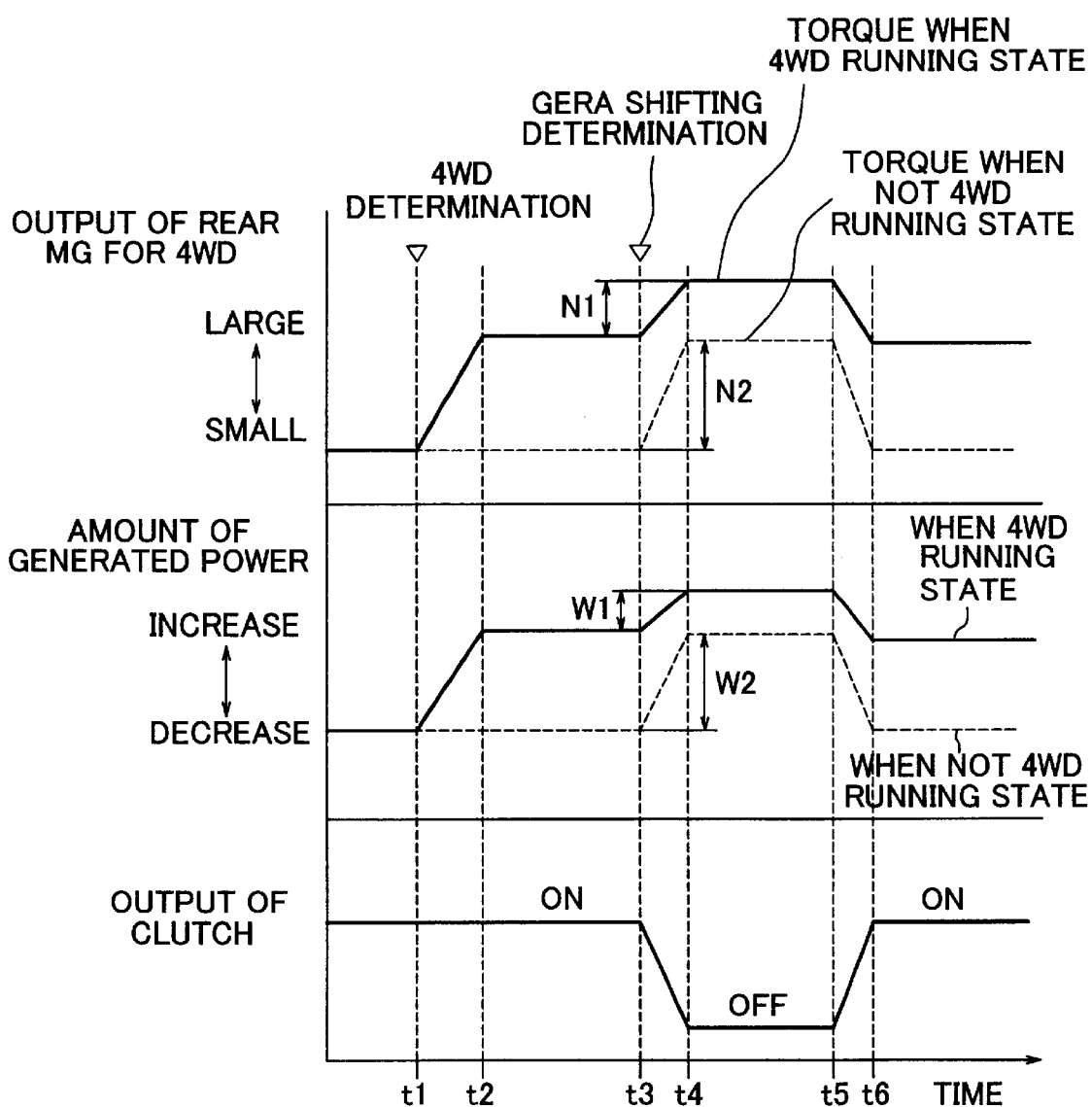
FIG. 8 is a time chart corresponding to the control shown in FIG. 6.

FIG. 8 shows a time chart indicating each state of the respective systems upon execution of upshifting control. In the time chart, it is assumed that the motor generator 5 is serving as a generator with upshifting such that the resultant power is supplied to the motor generator 48 to increase the torque thereof. In the time chart shown in FIG. 8, the vehicle running state of the system in the four-wheel-drive mode is indicated by a solid line, and the vehicle running state of the system not in the four-wheel-drive (that is, in a two-wheel-drive) mode is indicated by a dashed line.

The state of the system when running in the-four-wheel-drive mode indicated by the solid line in FIG. 8 will be described hereinafter. When a 4WD running state is determined as being established at time t1, the power of the motor generator 5 is increased and the torque output from the motor generator 48 is increased. At this time, the gear shifting has not yet been determined so the clutch 41 is in an ON (engaged) state.

At time t2 onward from time t1 after the elapse of a predetermined period of time, the amount of power generated by the motor generator 5, as well as the torque output from the motor generator 48 are controlled to be substantially constant. Then, when the gear shifting determination (upshifting determination) is established, disengagement of the clutch 41 starts, increasing the amount of power generated by the motor generator 5, as-well as the torque output from the motor generator 48. Then at time t4 onward, the amount of power generated by the motor generator 5 is controlled so as to be substantially constant after being increased by W1 compared with the state before gear shifting determination was established. Likewise, the torque output from the motor generator 48 is controlled sodas to be substantially constant after being increased by N1 compared with the state before gear shifting determination was established.

When completion of the shifting is determined at time t5, engagement of the clutch 41 starts and the amount of power generatedby the motor generator 5 starts decreasing and the output torque of the motor generator 48 starts decreasing. At time t6, engagement of the clutch 41 is completed, and the amount of power generated by the motor generator 5 and the output torque of the motor generator 48 are controlled in substantially the same way as with the control performed for the period from time t2 to time t3.

The state of the system when not running in the four-wheel-drive mode indicated by the dashed line in FIG. 8 will be described hereinafter. If 4WD determination is not established at time t1 onward, the amount of power generated by the motor generator 5 starts increasing at the time when the gear shifting determination is established at time t3, and the torque output from the motor generator 48 starts increasing. Then at time t4 onward, the amount of power generated by the motor generator 5 is controlled so as to be substantially constant after being increased by W2 compared with the state before gear shifting determination was established. The amount of the torque output form the motor generator 48 is controlled so as to be substantially constant after being increased by N2 compared with the state before gear shifting determination was established.

At time t5, the amount of the power generated by the motor generator 5 starts decreasing and the torque output from the motor generator 48 also starts decreasing. At time t6 onward, the amount of the power generated by the motor generator 5 and the torque output from the motor generator 48 are controlled to be in substantially similar states as those observed from time t2 to time t3. The amount of power generated by the motor generator 5 and the torque output from the motor generator 48 in the four-wheel-drive running mode are controlled to be greater (higher) than those in the two-wheel drive running mode.

As mentioned above, in this embodiment, the torque transmitted from the motor generator 48 to the rear wheels 52 is increased t6. prevent a decrease in driving force acting on the vehicle as a whole when the torque transmitted to the front wheels 44 is reduced due to disengagement of the clutch 41 during upshifting. This enables the loss of torque which accompanies gear shifting to be decreased, preventing the driver from feeling uneasiness.

The motor generator 48 is preliminarily mounted in the vehicle in order to transmit torque to the rear wheels 52 upon a torque output demand other than for gear shifting performed by the transmission 9, that is, selection of the four-wheel-drive running mode. Therefore, no additional drive source is necessary in order to prevent a loss of torque while upshifting, thereby preventing an increase in vehicle manufacturing costs and vehicle weight.

In this embodiment, the degree of increase in the torque transmitted from the motor generator 48 to the rear wheels 52 (or increase rate, increase amount, increase ratio) in the two-wheel-drive running state is different from that in the four-wheel-drive running state.

This makes it possible to prevent a change in the vehicle running performance between the state before gear shifting and the state during gear shifting. Specifically, the increase in the torque transmitted from the motor generator 48 to the rear wheels 52 in the four-wheel-drive running mode is set to be smaller (less) than that in the two-wheel-drive running mode. Accordingly, when increasing the torque transmitted to the rear wheels 52 owing to upshifting in the four-wheel-drive running mode, the torque applied to the rear wheels 52 may be prevented from being excessively large, thus avoiding slippage thereof.

FIG. 7 shows the gear shifting map applied to the position D. However, the control routine shown in FIG. 6 may be applied to upshifting based on gear shifting maps (not shown) applied to the respective positions of position 4, position 3, position 2.

In the above-identified control example, the torque to be output from the motor generator 48 during gear shifting is calculated based on the accelerator opening. The current value is controlled such that the torque corresponding to the calculated value is output from the motor generator 48. More specifically, control is performed such that the greater the depression amount of the accelerator pedal 59, the larger the current value becomes. The accelerating force of the vehicle generated by driving the motor generator 48 during gear shifting conforms to the intention of the driver. When the depression amount of the accelerator pedal 59 is changed by the driver during gear shifting, the torque output from the motor generator changes accordingly.

The current value used for controlling the motor generator 48 during gear shifting can be controlled depending on the depression amount of the accelerator pedal. Alternatively, it may be variable depending on the type of gear shift. The decrease in acceleration force caused by gearshifting from the second to the third speed is lower than that caused by gear shifting from the first to the second speed. Likewise the torque output from the motor generator 48 during gear shifting from the second to the third speed may be lower than that during gear shifting from the first to the second speed. As a result, the current value for controlling the motor generator 48 is set to output torque such that the vehicle acceleration before gear shifting can be maintained as much as possible based on such information as the depression amount of the accelerator pedal 59, gear speed before and after gear shifting, and vehicle speed.

In this embodiment, the shift lever 47 is operated to the position L. When the accelerator opening becomes zero, such control as to intensify the engine brake force is performed by, for example, automatically gear shifting from the fourth to the third speed. Concurrently, the motor generator 48 is made to serve as a generator upon receipt of power input from the rear wheels 52 so as to the enhance braking force acting on the vehicle as a whole. Additionally, the electric energy generated by the motor generator 48 can be used to charge the battery 8.

That is, conventionally, when a vehicle is running on inertia, power input from the wheels is converted into heat energy by the rotational resistance of the power transmission system and so forth, and discarded. Meanwhile, in the present embodiment, power input from the wheels 52 of a vehicle running on inertia is converted into electric energy using the generating function of the motor generator 48 so as to charge the battery 8, for what might be called energy regeneration. Control in which the motor generator 48 serves as a generator may be automatically performed separately from the operation of the lever 47 in the case where a depression state of the foot brake pedal 57 is detected by a signal from the brake sensor 58.

Figure 6:
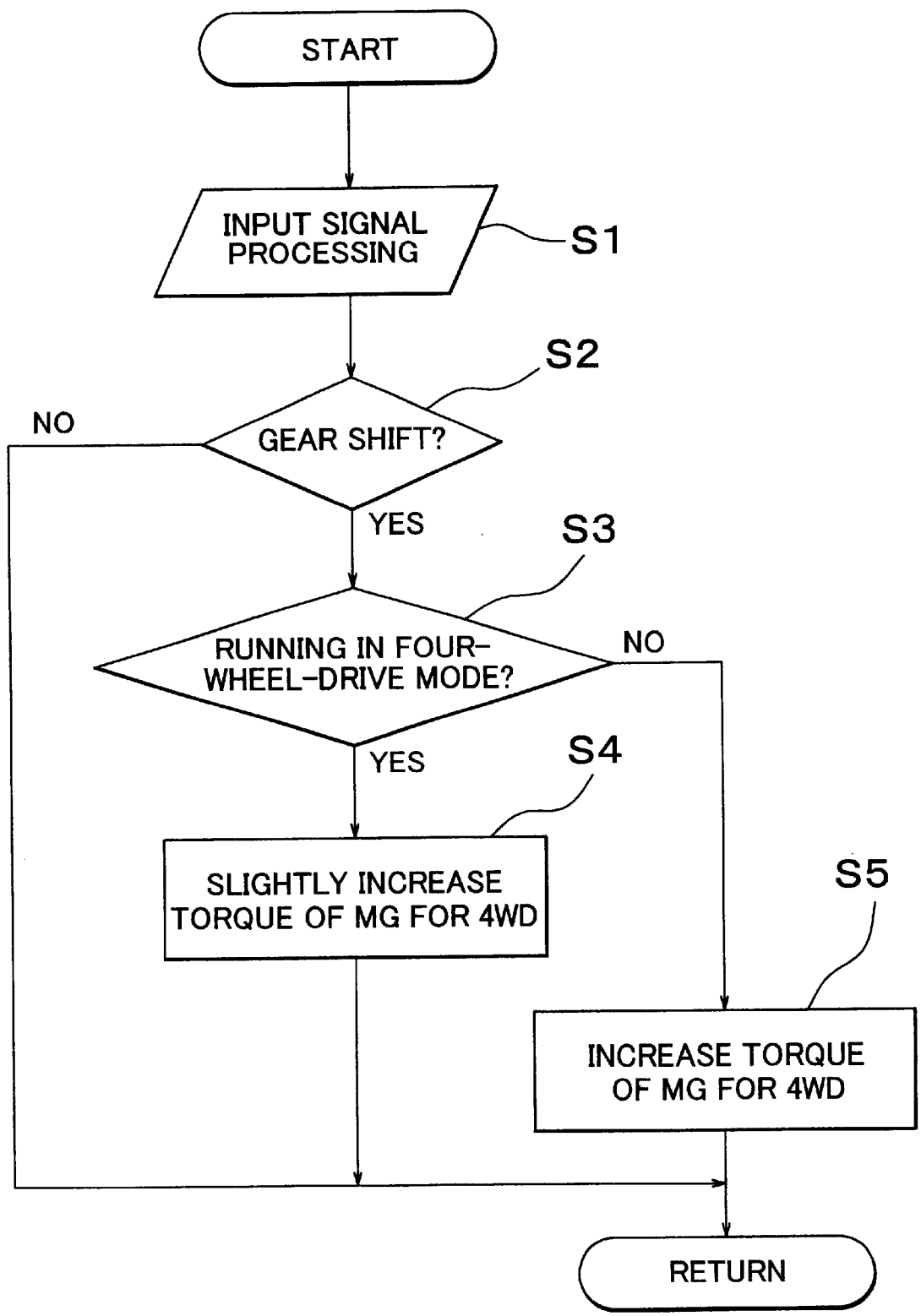
FIG. 6 is a flowchart showing an example of control routine executed by a control unit of a vehicle according to the invention.

The control routine shown in FIG. 6 may be applied to a vehicle having a semi-automatic transmission in which gear shifting is performed through manual operation of a shift lever such that engagement/disengagement of a clutch disposed between the transmission and the engine can be automatically performed.

According to the embodiment shown in FIG. 1, the vehicle employs different wheels for transmitting torque from the engine 1 than those for transmitting torque from the motor generator 48. This embodiment may also be applied to a vehicle employing the same wheels for transmitting engine torque as those for transmitting motor generator torque, or a vehicle employing partially different wheels.

A vehicle that is capable of transmitting torque from the engine and the motor generator to the front and rear wheels (a four-wheel-drive vehicle capable of transmitting engine torque to the front and rear wheels constantly, and assisting the torque transmitted to the front and rear wheels by the motor generator) may be exemplified as the former type of the vehicle. A vehicle that is capable of transmitting, the engine torque to the front and rear wheels and transmitting the motor generator torque to either the front wheels or the rear wheels (a four-wheel-drive vehicle capable of transmitting the engine torque to the front and rear wheels constantly, and assisting the torque transmitted to either the front wheels or the rear wheels by the motor generator) may be exemplified as the latter type of vehicle. The control system of the invention can be applied to a vehicle structured such that the motor generator torque is transmitted to the wheels without passing through the transmission.

What is claimed is:

1. A four-wheel-drive vehicle control system comprising:
a synchro-mesh transmission, which transmits a torque therethrough;
a first drive source that generates the torque for driving wheels;
a first transmission path through which the torque is transmitted from the first drive source via the synchro-mesh transmission;
a clutch disposed in the first transmission path, which is automatically engaged or disengaged upon gear shifting of the synchro-mesh transmission;
a second drive source that generates the torque for driving wheels;
a second transmission path through which the torque is transmitted from the second drive source without passing through the synchro-mesh transmission; and
a control portion that drives and controls the second drive source so as to generate the torque to be transmitted from the second drive source to the wheels upon gear shifting of the synchro-mesh transmission, wherein
the wheels include first wheels disposed in the first transmission path and second wheels disposed in the second transmission path,
the torque generated by the first drive source is transmitted to the first wheels via the synchro-mesh transmission and the torque generated by the second drive source is transmitted to the second wheels without passing through the synchro-mesh transmission, and
an amount of increase of the torque transmitted from the second drive source to the second wheels upon gear shifting of the synchro-mesh transmission is varied depending on whether the torque is transmitted only to the first wheels upon gear shifting of the synchro-mesh transmission or the torque is transmitted to the first wheels and the second wheels upon gear shifting of the synchro-mesh transmission.

2. The four-wheel-drive vehicle control system according to claim 1, wherein
the control portion sets the amount of increase of the torque from the second drive source to the second wheels when the torque is transmitted to the first wheels and the second wheels upon gear shifting of the synchro-mesh transmission to be smaller than the amount of increase of the torque from the second drive source to the second wheels when the torque is being transmitted only to the first wheels upon gear shifting of the synchro-mesh transmission.

3. The four-wheel-drive vehicle control system according to claim 1, wherein
the control portion controls the second drive source to increase the torque to be transmitted from the second drive source to the second wheels in accordance with a depression amount of an accelerator pedal.

4. The four-wheel-drive vehicle control system according to claim 1, wherein
the control portion controls the second drive source to increase the torque to be transmitted from the second drive source to the second wheels in accordance with the shifting gear of the synchro-mesh transmission.

5. The four-wheel-drive vehicle control system according to claim 1, wherein
the control portion controls the second drive source to generate the torque to be transmitted from the second drive source to the second wheels such that during gear shifting, the driving force is kept at the same level as that of the driving force before gear shifting.

6. The control system according to claim 1, wherein the second drive source is a motor generator.

7. The control system according to claim 6, wherein the motor generator provides with:
a function for generating torque to be transmitted to the wheels during running of the vehicle; and
a regenerative function for re-generating electric power based on power input from the wheels during braking of the vehicle.

8. The control system according to claim 1, wherein the first drive source is an engine.

9. The control system according to claim 1, further comprising:
a generator that generates an electric power,
wherein the second drive source is driven by the electric power of the generator.

10. A vehicle control method comprising steps of:
providing a synchro-mesh transmission, a first drive source that generates a torque for driving wheels, a first transmission path through which the torque is transmitted from the first drive source via the synchro-mesh transmission, a clutch disposed in the first transmission path, which disengages upon gear shifting of the synchro-mesh transmission;
providing a second drive source that generates the torque for driving wheels and a second transmission path through which the torque is transmitted from the second drive source without passing through the synchro-mesh transmission;
determining whether or not the gear is shifted; and
driving and controlling the second drive source so as to generate the torque to be transmitted from the second drive source to the wheels upon determination that the gear of the synchro-mesh transmission is shifted, wherein
the wheels include first wheels disposed in the first transmission path and second wheels disposed in the second transmission path,
the torque generated by the first drive source is transmitted to the first wheels via the synchro-mesh transmission and the torque generated by the second drive source is transmitted to the second wheels without passing through the synchro-mesh transmission, and
an amount of increase of the torque transmitted from the second drive source to the second wheels upon gear shifting of the synchro-mesh transmission is varied depending on whether the torque is transmitted only to the first wheels upon gear shifting of the synchro-mesh transmission or the torque is transmitted to the first wheels and the second wheel upon gear shifting of the synchro-mesh transmission.

11. The control method according to claim 10, wherein the amount of increase of the torque generated when the torque is being transmitted to the first wheels and the second wheels is set to be smaller than the amount of increase of the torque generated when the torque is being transmitted only to the first wheels when generating the torque to be transmitted from the second drive source to the second wheels upon gear shifting of the synchro-mesh transmission.

12. The control method according to claim 10, wherein the torque transmitted from the second drive source to the second wheels is increased in accordance with a depression amount of an accelerator pedal.

13. The control method according to claim 10, wherein the torque transmitted from the second drive source to the second wheels is increased in accordance with the shifting gear of the synchro-mesh transmission.

14. The control method according to claim 10, wherein the torque transmitted from the second drive source to the second wheels is generated such that during gear shifting, the driving force is kept at the same level as that of the driving force before gear shifting.

15. The control method according to claim 10, wherein the second drive source is a motor generator.

16. The control method according to claim 15, wherein the motor generator provides with:
   a function for generating torque to be transmitted to the wheels during running of the vehicle; and
   a regenerative function for re-generating electric power based on power input from the wheels during braking of the vehicle.

17. The control method according to claim 10, wherein the first drive source is an engine.

18. The control method according to claim 10, further comprising:
   providing a generator that generates an electric power, wherein the second drive source is driven by the electric power of the generator.

19. A vehicle control system comprising:
   a transmission, which transmits a torque therethrough;
   a first drive source that generates the torque for driving wheels;
   a first transmission path through which the torque is transmitted from the first drive source via the transmission;
   a clutch disposed in the first transmission path;
   a second drive source that generates the torque for driving wheels;
   a second transmission path through which the torque is transmitted from the second drive source without passing through the transmission; and
   a control portion that drives and controls the second drive source so as to generate the torque to be transmitted from the second drive source to the wheels upon gear shifting of the transmission, wherein
   the wheels include first wheels disposed in the first transmission path and second wheels disposed in the second transmission path,
   the torque generated by the first drive source is transmitted to the first wheels via the transmission and the torque generated by the second drive source is transmitted to the second wheels without passing through the transmission, and
   an amount of increase of the torque transmitted from the second drive source to the second wheels upon gear shifting of the transmission is varied depending on whether the torque is transmitted only to the first wheels upon gear shifting of the transmission or the torque is transmitted to the first wheels and the second wheels upon gear shifting of the transmission.

20. The vehicle control system according to claim 19, wherein
   the control portion sets the amount of increase of the torque from the second drive source to the second wheels when the torque is transmitted to the first wheels and the second wheels upon gear shifting of the transmission to be smaller than the amount of increase of the torque from the second drive source to the second wheels when the torque is being transmitted only to the first wheels upon gear shifting of the transmission.

21. A vehicle control method comprising:
   generating a torque for driving wheels from a first drive source;
   transmitting the torque through a transmission;
   transmitting the torque through a first transmission path from the first drive source via the transmission;
   disposing a clutch in the first transmission path;
   generating the torque for driving wheels from a second drive source;
   transmitting the torque through a second transmission path through from the second drive source without passing through the transmission;
   driving and controlling the second drive source via a control portion so as to generate the torque to be transmitted from the second drive source to the wheels upon gear shifting of the transmission, wherein the wheels include first wheels and second wheels;
   disposing the first wheels in the first transmission path;
   disposing the second wheels in the second transmission path; and
   varying an amount of increase of the torque transmitted from the second drive source to the second wheels upon gear shifting of the transmission depending on whether the torque is transmitted only to the first wheels upon gear shifting of the transmission or the torque is transmitted to the first wheels and the second wheels upon gear shifting of the transmission.

22. The vehicle control method according to claim 21, further comprising:
   setting the amount of increase of the torque generated by the control portion when the torque being transmitted to the first wheels and the second wheels is smaller than the amount of increase of the torque generated when the torque is being transmitted only to the first wheels, when generating the torque to be transmitted from the second drive source to the second wheels upon gear shifting of the transmission.

* * * * *